United States Patent
Herrmann et al.

(10) Patent No.: US 11,833,970 B2
(45) Date of Patent: Dec. 5, 2023

(54) INTERNAL REARVIEW DEVICE AND VEHICLE

(71) Applicant: MOTHERSON INNOVATIONS COMPANY LIMITED, London (GB)

(72) Inventors: Andreas Herrmann, Stuttgart (DE); Chang Kyun Han, Chungcheongbuk-do (KR); Cheol Ho Yim, Chungcheongbuk-do (KR); Ho Jin Huh, Chungcheongbuk-do (KR); Won Sik Hong, Chungcheongbuk-do (KR); Geon Young Choi, Chungcheongbuk-do (KR); Chang Hwan Lim, Chungcheongbuk-do (KR); Freshipali Ali, Chungcheongbuk-do (KR)

(73) Assignee: Motherson Innovations Company Limited, London (GB)

( * ) Notice: Subject to any disclaimer, the term of this patent is extended or adjusted under 35 U.S.C. 154(b) by 17 days.

(21) Appl. No.: 17/628,434

(22) PCT Filed: Jul. 23, 2020

(86) PCT No.: PCT/EP2020/070774
§ 371 (c)(1),
(2) Date: Jan. 19, 2022

(87) PCT Pub. No.: WO2021/018718
PCT Pub. Date: Feb. 4, 2021

(65) Prior Publication Data
US 2022/0266751 A1  Aug. 25, 2022

Related U.S. Application Data

(63) Continuation-in-part of application No. 16/524,953, filed on Jul. 29, 2019, now abandoned.

(30) Foreign Application Priority Data

Jul. 29, 2019 (DE) .................... 10 2019 120 396.1

(51) Int. Cl.
  *B60R 1/00*  (2022.01)
  *B60R 1/04*  (2006.01)
  (Continued)

(52) U.S. Cl.
  CPC ............... *B60R 1/04* (2013.01); *B60R 1/088* (2013.01); *B60R 1/1207* (2013.01);
  (Continued)

(58) Field of Classification Search
  CPC ......... B60R 1/04; B60R 1/088; B60R 1/1207; G01S 17/894; G02B 6/006; G02B 6/0068
  See application file for complete search history.

(56) References Cited

U.S. PATENT DOCUMENTS

2002/0005999 A1* 1/2002 Hutzel ..................... B60R 1/12
                                                     359/872
2005/0152054 A1   7/2005 Rumsey et al.
                  (Continued)

FOREIGN PATENT DOCUMENTS

EP    3126935 B    6/2018
EP    3126935 B1 * 6/2018   ............... B60R 1/04
                  (Continued)

OTHER PUBLICATIONS

German Office Action dated Jan. 28, 2020 of DE 10 2019 120 396.1.
(Continued)

*Primary Examiner* — Gerald J Sufleta, II
(74) *Attorney, Agent, or Firm* — Jones Day

(57) ABSTRACT

The disclosure refers to an internal rearview device (1) adapted for use with a motor vehicle, comprising: a rearview
(Continued)

element comprising at least one of a reflective element (10) and a display element, with the rearview element having a normal state and at least one anti-glare state, in which a glare experienced by a driver of the vehicle as a result of light reflected at the rearview element is reduced; a bezel (32) surrounding the rearview element and being surrounded by a housing (60); control means comprising sensor means connected to at least one printed circuit board (40, 50), which is arranged between the housing (60) and the rearview element, for controlling at least the state of the rearview element; and a mount assembly (70) which is configured to attach the housing (60) to the vehicle; wherein the perimeter edge (31) of the bezel (32) is exposed to and is viewable by the driver of the vehicle when said device (1) is normally mounted in the vehicle; said perimeter edge (31) comprises a curved surface disposed between the front and/or reflective surface of the rearview element (10) and the housing (60); and the housing (60) is provided with a protrusion (65) projecting edgewise, beyond the curved surface of the perimeter edge (31) such that it is viewable by the driver when said device (1) is normally mounted in the vehicle. The disclosure also refers to a vehicle with such an internal rearview device.

19 Claims, 5 Drawing Sheets

(51) Int. Cl.
*B60R 1/12* (2006.01)
*B60R 1/08* (2006.01)
*F21V 8/00* (2006.01)
*G01S 17/894* (2020.01)

(52) U.S. Cl.
CPC ............ *G01S 17/894* (2020.01); *G02B 6/006* (2013.01); *G02B 6/0068* (2013.01); *B60R 2001/1223* (2013.01); *B60R 2001/1253* (2013.01)

(56) References Cited

U.S. PATENT DOCUMENTS

| | | | |
|---|---|---|---|
| 2012/0236388 A1 | 9/2012 | De Wind et al. | |
| 2013/0187017 A1 | 7/2013 | Roth | |
| 2014/0192431 A1 | 7/2014 | Sloterbeek et al. | |
| 2015/0334354 A1 | 11/2015 | Uken et al. | |
| 2018/0056871 A1* | 3/2018 | Karner | H04N 7/181 |
| 2018/0257566 A1* | 9/2018 | Hamlin | B60R 1/04 |
| 2019/0146297 A1* | 5/2019 | Lynam | G02F 1/153 |
| | | | 359/265 |

FOREIGN PATENT DOCUMENTS

| | | |
|---|---|---|
| WO | WO 2012/051294 A2 | 4/2012 |
| WO | WO 2017/191558 | 11/2017 |

OTHER PUBLICATIONS

International Search Report dated Sep. 24, 2020 of International application No. PCT/EP2020/070774.
Written Opinion dated Sep. 24, 2020 of International application No. PCT/EP2020/070774.

* cited by examiner

INTERNAL REARVIEW DEVICE AND VEHICLE

CROSS-REFERENCE TO RELATED APPLICATIONS

This application is a is a National Stage Entry of International Patent Application No. PCT/EP2020/070774, filed on Jul. 23, 2020, which claims the benefit of priority to both German Patent Application No. DE 10 2019 120 396.1, filed on Jul. 29, 2019, and to U.S. application Ser. No. 16/524,953, filed on Jul. 29, 2019, each of which is hereby incorporated by reference in its entirety for all purposes.

BACKGROUND

1. Field

The present disclosure refers to an internal rearview device and a vehicle therewith.

2. Related Art

There are numerous different internal rearview devices available on the market with different functionalities. In the following reference is made to two documents of the applicant illustrating the spectrum of such devices.

EP 3 126 935 B1 relates to a pivotable interior mirror for a vehicle, having a pivoting device which is designed to move the interior mirror from a normal position to a dimming position, wherein in the dimming position a glare of a driver of the vehicle by the inner mirror is reduced; and an operating device configured to activate the pivoting device in response to a movement of the driver.

A rearview device including a housing, a bezel and a rearview element used for vehicles is known from WO 2018/167096 A1. In one embodiment the bezel includes a transparent or chrome-based coating as to allow one or more lighting assemblies positioned in or beneath the bezel to illuminate the surrounding and provide different functions to the driver or other persons. For example, different indicator functions can be provided. Different electronic means may be placed in or beneath the bezel to optimize the used space inside the rearview device.

Further, it is known to provide an internal rearview device with an human machine interface (HMI), in particular comprising a capacitive touch panel. EP 3 017 545 A1 of the applicant discloses a capacitive touch panel comprising a transparent panel substrate, a front surface of the substrate comprising a conductive translucent layer which, in use, is visible to a user; at least one light source associated with the back surface, wherein said light source is switchable between an 'on' state in which an illuminated icon is visible on the front surface of the cover panel and an 'off' state in which the illuminated icon is not visible on the front surface of the cover panel, wherein the light source is switchable from the off state to the on state by a change in capacitance of the conductive translucent layer; at least one switch associated with the back surface, wherein the switch is activable by a user pressing the touch panel in the vicinity of the illuminated icon to provide an output signal capable of performing a function.

Nowadays internal rearview devices equipped with a dimming function often make usage of an electrochromic reflective elements. US 2013/0252979 A1 discloses a special electrochromic element with an electrolyte layer which may be a solid but not yet used in rearview devices.

US 2012/0236388 A1 refers to an interior rearview mirror assembly including a housing and a mirror reflective element having a glass substrate. The housing includes an element that protrudes beyond a rear surface of the glass substrate and towards the front surface of the glass substrate when the reflective element is at least partially received at the housing. The glass substrate includes a slanted rear perimeter edge-portion along a perimeter circumference of the rear surface of the glass substrate to at least partially accommodate the element of the housing when the reflective element is at least partially received at the housing. The glass substrate includes a beveled front perimeter along a perimeter circumference of the front surface of the glass substrate. The beveled front perimeter of the glass substrate is exposed and viewable by the driver of the vehicle.

WO 2012/051294 A1 teaches a rearview assembly having a mounting structure configured to be operably coupled with a vehicle. A housing is operably connected with the mounting structure and a rearward viewing device is supported by one of the housing and the mounting structure. The rearward viewing device provides a rearward view to a vehicle driver and includes a front substrate and a rear substrate. The entire front surface of the front substrate is exposed and the entire rear substrate is positioned behind the front substrate. A concealing layer is disposed about a periphery of the rearward viewing device between the front substrate and the rear substrate. A partially optically transparent bezel is disposed adjacent to both the rearward viewing device and the housing, the optically transparent bezel having an edge radius greater than 2.5 mm and the optically transparent bezel being substantially flush with the front surface of the front substrate.

EP 3 126 935 B1 teaches a pivotable internal mirror for a vehicle, with a mirror surface, in particular in the form of a first surface of a wedge mirror, a sensor device for detecting at least one gesture of a driver of the vehicle and/or light impinging on the first surface of the wedge mirror, and a pivoting device for pivoting the mirror surface from a normal position into at least one anti-glare position, in which a glare experienced by the driver as a result of light reflected at the mirror surface is reduced, the pivoting device being activable as a function of at least one output signal from the sensor device, wherein the sensor device is suitable for measuring a light propagation time and is a component of an operator control device for the pivoting device, wherein the operator control device detects motion patterns within a first region of the internal mirror and/or provides at least one virtual button within a second region of the internal mirror.

WO 2017/191558 A1 refers to an electro-optic rearview mirror assembly for a vehicle includes a caseless electro-optic rearview mirror reflective element and a plate attached at the rear of the reflective element. The mirror reflective element connected to and pivotal about a windshield electronics module via a ball and socket pivot joint. Control circuitry may be disposed in a windshield electronics module for automatically controlling dimming of the electro-optic medium or alternatively, dimming of the electro-optic medium is automatically controlled via a multifunctional rear backup camera system of the equipped vehicle. Optionally, the control circuitry controls dimming of the electro-optic medium of the mirror reflective element via wiring that passes through the ball and socket pivot joint. Optionally, image data captured by the multifunctional rear backup camera may be used for ambient light determination and to provide video image display at the interior rearview mirror assembly.

US 2015/0334354 A1 refers to a visor assembly for a vehicle includes a visor element configured to pivotally attach at an interior portion of a vehicle so as to be pivotable between a non-use position, where the visor is disposed along a roof of the vehicle, and a use position, where the visor element is disposed at least partially along a windshield of the vehicle. A vanity mirror reflective element includes a glass mirror substrate and a mirror reflector coating. The vanity mirror reflective element is disposed at the visor element so as to be viewable by a driver of the vehicle when the visor element is pivoted to the use position. The mirror substrate has a rounded perimeter edge that is exposed at the visor element and is viewable by the driver of the vehicle when the visor element is pivotally attached at the interior portion of the vehicle and in the use position.

SUMMARY

Despite the large amount of internal rearview mirrors known, there is still the need to enhance functionality and design of the same. The object of the present disclosure is to provide an optically appealing internal rearview device which preferably allows special light effects as well as an easy to actuate human machine interface.

This object is solved by an internal rearview device of claim 1 that is adapted for use with a motor vehicle, comprising: a rearview element comprising at least one of a reflective element and a display element; a bezel surrounding the rearview element and being surrounded by a housing; and a mount assembly which is configured to attach the housing to the vehicle. The perimeter edge of the bezel is exposed to and is viewable by the driver of the vehicle when said device is normally mounted in the vehicle; and said perimeter edge comprises a curved surface disposed between the front and/or reflective surface of the rearview element and the housing; and the housing is provided with a protrusion projecting edgewise, beyond the curved surface of the perimeter edge such that it is viewable by the driver when said device is normally mounted in the vehicle. The protrusion can provide a step with a height between 0.1 and 2.1 mm, and/or the curvature of the curved surface can have a radius of at least 2.5 mm. The curved surface of the perimeter edge of the bezel ensures safety by avoiding any edges which might cause injuries of a driver or another person inside the vehicle.

According to the present disclosure it is preferred that the internal rearview device further comprises at least one or more light assemblies preferably being positioned at least partly within the interior space of the bezel and/or emitting light into the bezel acting as a light guide to illuminate at least a region between the housing and the rearview element and/or to provide actuation means.

In this respect it is preferred that the one or more light assemblies are configured to direct a plurality of different color lights to an entire surface of the bezel so that the entire bezel can have one color at a time, and/or the one or more light assemblies are configured to provide a plurality of different color lights to different zones of the bezel so that different zones of the bezel can have different colors at a time, and/or the one or more light assemblies are configured to direct light of a selected brightness and/or color to at least one selected region or the entire surface of the bezel.

Still further, according to the present disclosure it is proposed that the bezel is made of a plastic substrate which is at least one of colored, surface finished, transparent, and coated; and/or the bezel is coated and a coating of the bezel is at least one of a decorative coating, an advanced surface technology surface coating, and a spectrally controlling system; and/or the bezel is formed or molded from a polymeric substrate.

Further advantages are provided when the bezel exhibits reflective features, wherein the bezel is transparent and includes a chromium-based coating, in particular making the one or more light assemblies beneath the bezel hidden until lit, wherein preferably the chromium-based coating is an alloy of chromium and a dopant material, the dopant material being selected from hexagonally close-packed transition metals, the alloy having a crystal structure of a primary body-centered cubic phase in coexistence with a secondary omega hexagonally close-packed phase.

It is preferred that the perimeter edge and/or the curved surface is provided with the chromium-based coating, and/or the perimeter edge and/or the curved surface is provided with at least one sensor of the sensor means and/or at least one element of actuation, comprising in particular a mark, icon and/or cut-out providing a virtual button.

According to embodiments at least one printed circuit board can be provided, which is arranged between the housing and the rearview element, and/or control means can be provided, which is connected to the one or more light assemblies and/or comprises sensor means connected to the at least one printed circuit board.

A very simple structure according to the present disclosure is characterized in that the bezel is provided by a housing cover, and the at least one printed circuit board, the sensor means and/or the one or more light assemblies is/are positioned at least partly between the housing cover and the housing, with the housing cover preferably comprising a support part for the reflective element being provided with at least one opening in particular for access to the printed circuit means and/or at least one window in particular for transmission of radiation to a sensor of the sensor means.

With the present disclosure it is proposed that the sensor means comprises at least one first sensor in the form of a TOF (Time of Flight) sensor, in particular comprising a TOF camera, and/or at least one second sensor for performing an ALS (Ambient Light Sensor) function, and/or at least one third sensor in the form of a photo electric sensor, in particular to be irradiated by an additional light source arranged within the vehicle, and/or at least one fourth sensor in the form of a touch sensor, preferably providing a virtual button.

In this respect it is preferred that the first sensor, a first second sensor, a first third sensor and/or a first fourth sensor is mounted on the side of the device featuring the reflective surface of the rearview element, in particular on the reflective surface or behind the reflective surface, preferably provided with a window for transmission of radiation; and/or a second second sensor is mounted on the opposite side of the device from the reflective surface or behind the reflective surface, preferably provided with a window for transmission of radiation, and/or a second third sensor and/or a second fourth sensor is mounted on or in the bezel; and/or a third sensor and/or a third fourth sensor is mounted on or in the housing.

Still further, the present disclosure proposes that the internal rearview device comprises at least one actuation means, preferably comprising one or more buttons, in particular virtual buttons, mounted on or in the bezel, the housing and/or on the reflective element, preferably comprising a touch sensor and/or being surveilled by a camera, connected to the control means.

It is also proposed that the control means is suited to detect motion patterns within a first spacing interval relative to the reflective surface and/or provides at least one virtual button within a second spacing interval, with preferably the first spacing interval being provided in the first region of the control means and the second spacing interval being provided in the second region of the control means, in particular the second spacing interval being arranged closer to the reflective surface than the first spacing interval.

With the present disclosure it is further proposed that the control means is configured to be connected to a control unit of the vehicle, in particular to take the state of the vehicle and/or the surroundings of the vehicle into consideration when controlling the device.

It can also be the case that the rearview element has a normal state and at least one anti-glare state, in which a glare experienced by a driver of the vehicle as a result of light reflected at the rearview element is reduced, with the reflective element in particular comprising an electrochromic element, which is preferably controlled via the control means.

Preferred embodiments of the internal rearview device of the present disclosure are characterized in that the printed circuit board is fixed to the housing, preferably in form of an EC printed circuit board and/or a sensor and/or actuation means printed circuit board.

It is also proposed that the printed circuit board is shaped, bent and/or provided with at least one cut-out to avoid interference with connection means of the mount assembly.

The present disclosure further provides a vehicle equipped with an internal rearview device of the disclosure.

Such a vehicle can comprise at least one camera and/or light source to detect the actuation of the actuation means.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the disclosure is not limited to the precise arrangements and instrumentalities shown. The accompanying drawings, which are incorporated in and constitute a part of this specification, illustrate an implementation of devices consistent with the present disclosure in a schematic manner and, together with the description, serve to explain advantages and principles consistent with the disclosure.

FIG. 1b is an exploded view of the internal rearview device of FIG. 1a;

FIG. 4b is an enlargement of a part of FIG. 4a;

DETAILED DESCRIPTION

Figure 1A:
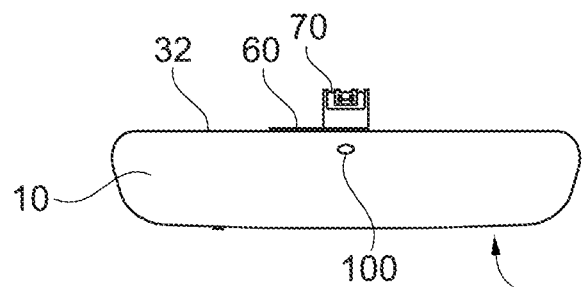
FIG. 1a is a front view of an internal rearview device of a first embodiment of the disclosure.

Before explaining examples of the present disclosure in detail, it is to be understood that the disclosure is not limited in its application to the details of construction and to the arrangements of the components set forth in the following description or illustrated in the drawings. The figures and written description are provided to teach any person skilled in the art to make and use the disclosure for which patent protection is sought. The disclosure is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present disclosures will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," "corner," are used in the description for clarity in specific reference to the figures and are not intended to limit the scope of the disclosure or the appended claims. Further, it should be understood that any one of the features of the disclosure may be used separately or in combination with other features. Other systems, methods, features, and advantages of the disclosure will be or become apparent to one with skill in the art upon examination of the figures and the detailed description. It is intended that all such additional systems, methods, features, and advantages be included within this description, be within the scope of the present disclosure, and be protected by the accompanying claims.

Figure 1B:
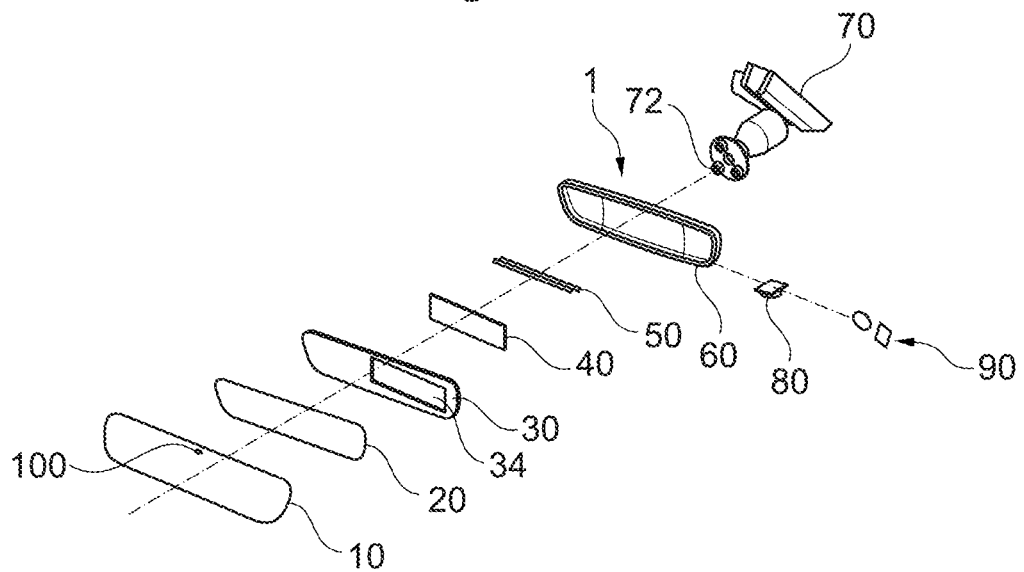

FIGS. 1a and 1b show an internal rearview device 1 of a first embodiment of the disclosure. The respective rearview device 1 is a multi-functional rearview device with a reflective element for example in form of an electrochromic (EC) glass 11. Said EC glass 10 is attached to a double-sided adhesive tape 10 for attachment to a housing cover 30, which in turn is to be mounted to a housing 60 with an EC printed circuit board 40 and a button printed circuit board 50 arranged between the housing cover 30 and the housing 60. A button 80 is to be attached to the housing 60 and mounting means 90 are provided for that purpose, with a respective mounting been described in further detail below. The housing 60 is mounted on a mounting assembly 70 via a bolt 72 thereof, such that it can be attached to a not shown vehicle, for example the windshield thereof, and can be moved relative thereto.

A sensor 100 for example in form of a time of light (TOF) sensor is attached in the upper region of the EC glass 10, on the reflective surface thereof. Said sensor 100 is suited for controlling the dimming of the EC glass 10 and, therefore, is connected to the printed circuit board 40. For the purpose of the connection, not only of the sensor 100 but also of the electrodes of the reflective element 10 the housing cover 30 is provided with an opening 34.

While the EC glass 10 is received in the housing cover 30 with a bezel 32 thereof surrounding the periphery of the reflective element 10, the housing cover 30 in turn is receives in the housing 60 with the housing 60 surrounding the periphery of the housing cover 30, which will be explained in further detail below.

In order to obtain a frameless like impression of the internal rearview mirror 1 in a front view as shown in FIG. 1a, the bezel 32 of the housing cover 30 at least can be covered by reflective coating, in particular a chromium-based coating as described for example in WO 2018/167096 A1. In addition, also the housing 60 can, at least partly, be provided with such a coating. However, it is to be noted and will be described later that a front view of the rearview device 1 provides a direct view not only of the EC glass 10 but also of the bezel 32 and the housing 60 surrounding the bezel 32.

Figure 2:
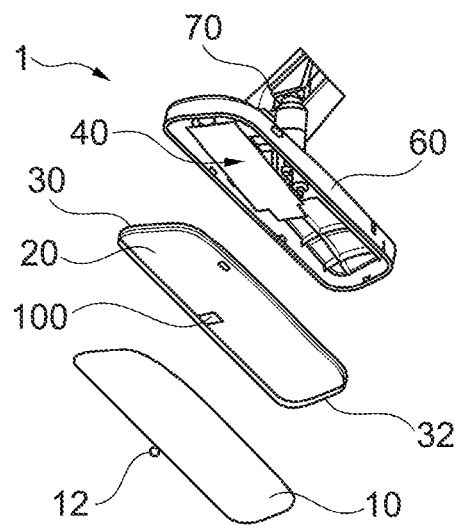
FIG. 2 is an exploded view of an internal rearview device of a second embodiment of the disclosure.

FIG. 2 shows the major components of an alternative internal rearview device 1 of the disclosure, which differs with respect to the one shown in FIGS. 1a and 1b in that the sensor 100 is arranged behind the EC glass 10 allowing a transmission of radiation, which can either be by choosing a respectively reduced reflectivity of the EC glass 10 as such or by providing a window 12 of the reflective layer of the EC glass 10 in the region of the sensor 100.

Figure 3A:
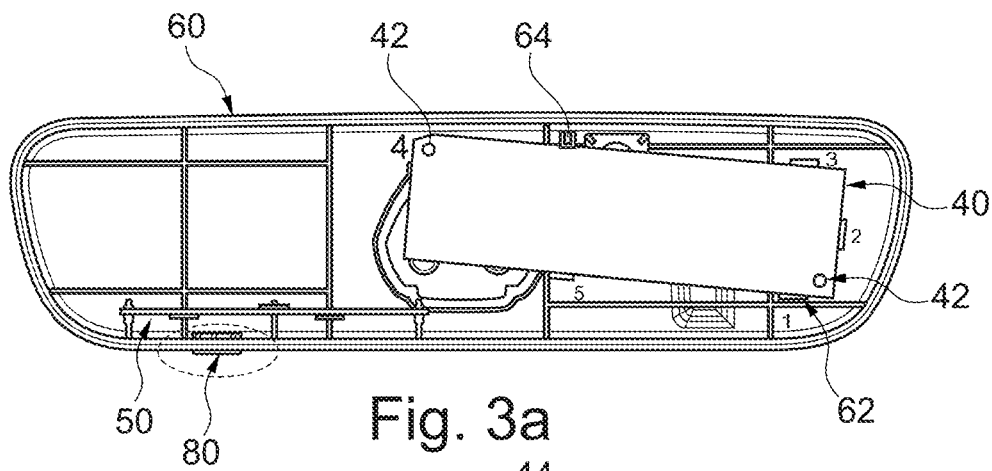
FIG. 3a is a front view of a housing carrying a printed circuit board.

FIG. 2 also shows that the EC printed circuit board 40 is fixed to the housing 60. This is shown in further detail in FIG. 3a, according to which the printed circuit board 40 is provided with two screw holes 42 and connected via a plurality of hooks 64 of the housing 60 to the housing 60. The housing 60, in addition, is provided with support ribs 62 for supporting the printed circuit board 40.

In addition, the printed circuit board 50 is also fixed to the housing 60 and connected to a button 80 of an HMI.

Figure 3B:
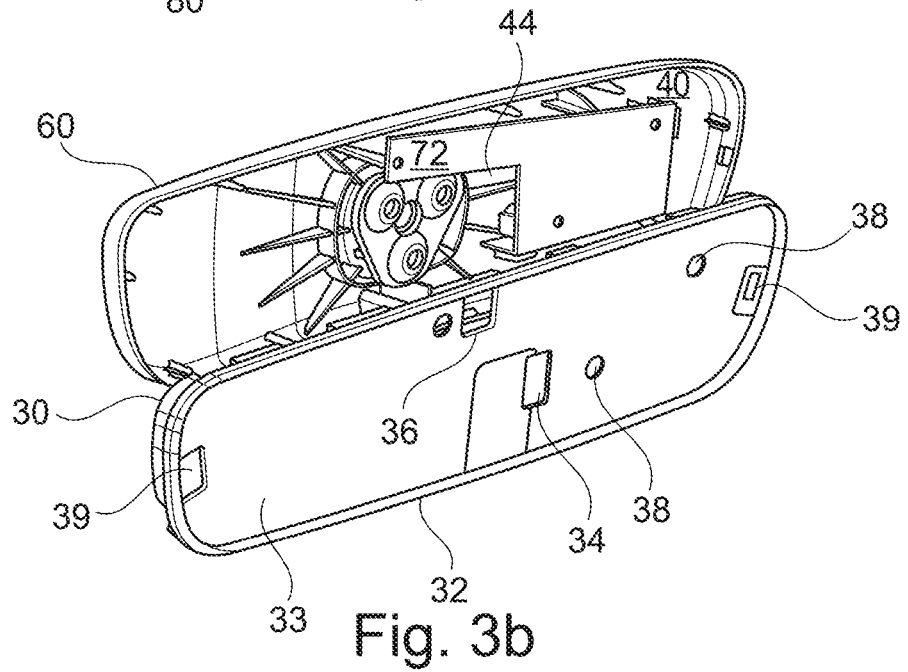
FIG. 3b is an exploded view of the housing carrying an alternative printed circuit board with a housing cover.

FIG. 3b shows the housing 60 with an alternative EC circuit board 40, with said alternative EC circuit board 40 being provided with a cut-out 44 in order to avoid any interference with the bolt 72 of the mount assembly 70 via which the housing 60 is mounted to the vehicle.

FIG. 3b also shows further details of the housing cover 30, not only being provided with the bezel 32 and a support part 33 for the EC glass 10 and the opening 34, but also with a through hole 36 to an additional or alternative sensor discussed below and with screw holes 38 and attachment means 39 facilitating an easy assembly.

Figure 3C:
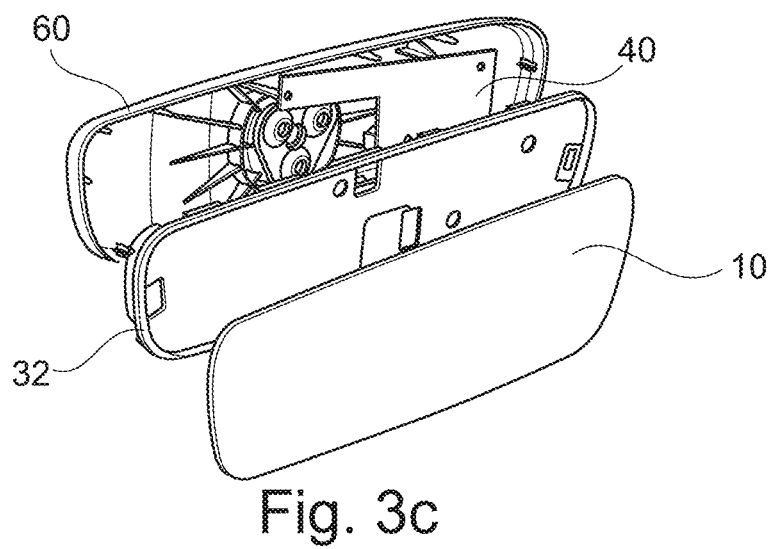
FIG. 3c is an exploded view of the housing carrying the printed circuit board and the housing cover as well as an reflective element of an internal rearview device of a third embodiment of the disclosure.

FIG. 3c shows the embodiment of FIG. 3b together with the EC glass 10 in an exploded view.

Figure 4A:
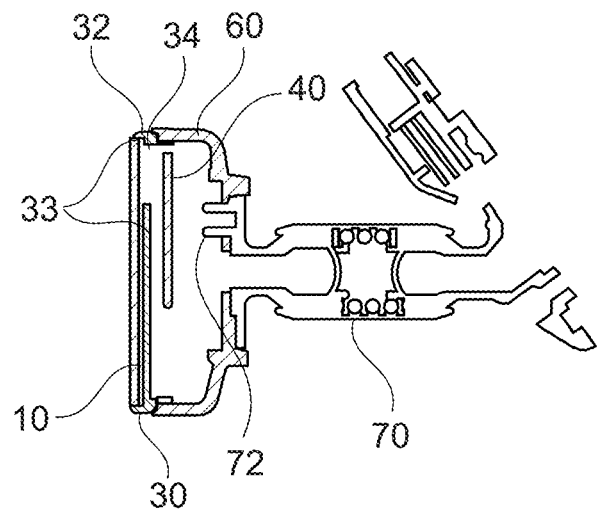
FIG. 4a is a sectional view of an internal rearview device of a fourth embodiment of the disclosure.

FIG. 4a illustrates still further features in particular of the housing cover 30. Before turning to those features, it can, again, be seen in said figure that the EC printed circuit board 40 is overlapping the opening 34 provided in the support part 33 of the housing cover 30. The bezel 32 of the housing cover 30 surrounding the EC glass 10 is provided with rounded edges 31 at its periphery between the front of the EC glass 10 and the housing 60 in order to avoid injuries. Accordingly, the perimeter edge 31 comprises a curved surface disposed between the EC glass 10 and the housing 60 with a radius r of curvature of preferably 2.8 mm.

Figure 4B:
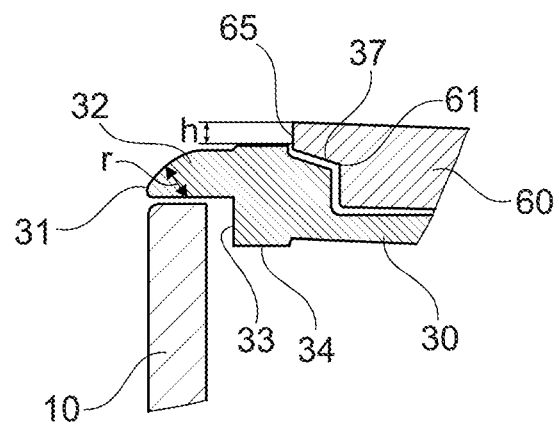

As can be best seen in FIG. 4b, the housing cover 30 is form fit to the housing 60 by being provided with a step 37 mating with a step 61 of the housing 60. The housing 60 also is provided with a protrusion 65 sideways extending beyond the housing cover 30 and, thus, the bezel 32 as well as the protrusion 65 are seen in a front view of the internal rearview device. The protrusion 65 also comprises a step with a height h of e.g. 1 mm. This structure allows for a multitude of functionalities as explained below.

Figure 4C:
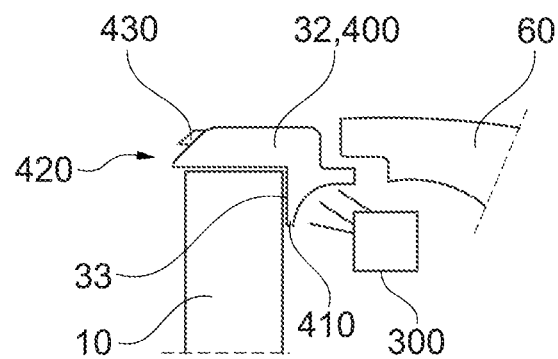
FIG. 4c is an enlargement of a part alternative to the one of FIG. 4b of an internal rearview device of a fifth embodiment of the disclosure.

FIG. 4c shows one of said functionalities, with a light assembly 300 being arranged to emit light into the bezel 32 acting a light guide 400. For that purpose, a light receiving surface 410 with additional lens function is provided by the light guide 400, and the light guide 400 directs the light from the light assembly 300 to a light emitting surface 420 in the region of the rounded edge 31 between the EC glass 10 and the housing 60. This arrangement allows, for example, to provide a plurality of different optical effects with light of different intensities and/or colors being provided between the reflective element 10 and the housing 60.

Both, the intensity and the color of the light can provide information to the driver or just serve to enhance the appeal of the internal rearview device 1.

In addition to the above described light effects, the structure shown in FIG. 4c also allows for very simple HMI by providing the light emitting surface 410 e.g. with a laser cut-out virtual button 430 and, thus, providing actuation means. For example, when touching the virtual button 430 or even only coming close to said button with a finger light will be reflected back into the light guide 400 and in case the light assembly 300 is also provided with sensor means can be detected in order to detect an actuation.

Figure 5:
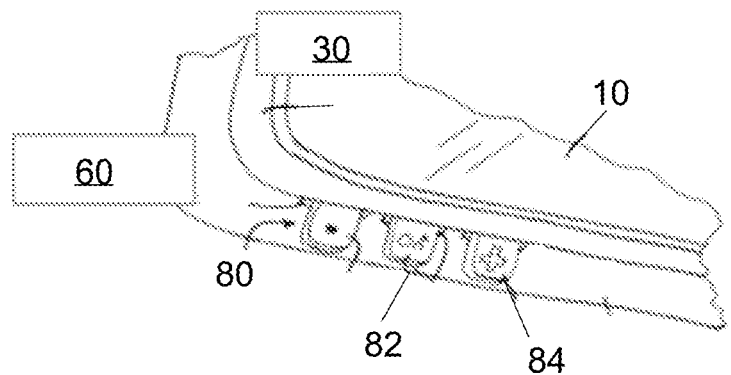
FIG. 5 is a perspective view of a part of an internal rearview device of a sixth embodiment of the disclosure.

Different HMIs in connection with the multi-functional rearview device 1 of the disclosure are possible. FIG. 5 shows an alternative possibility with buttons 80, 82 and 84 extending beyond the bezel 32.

Figure 6:
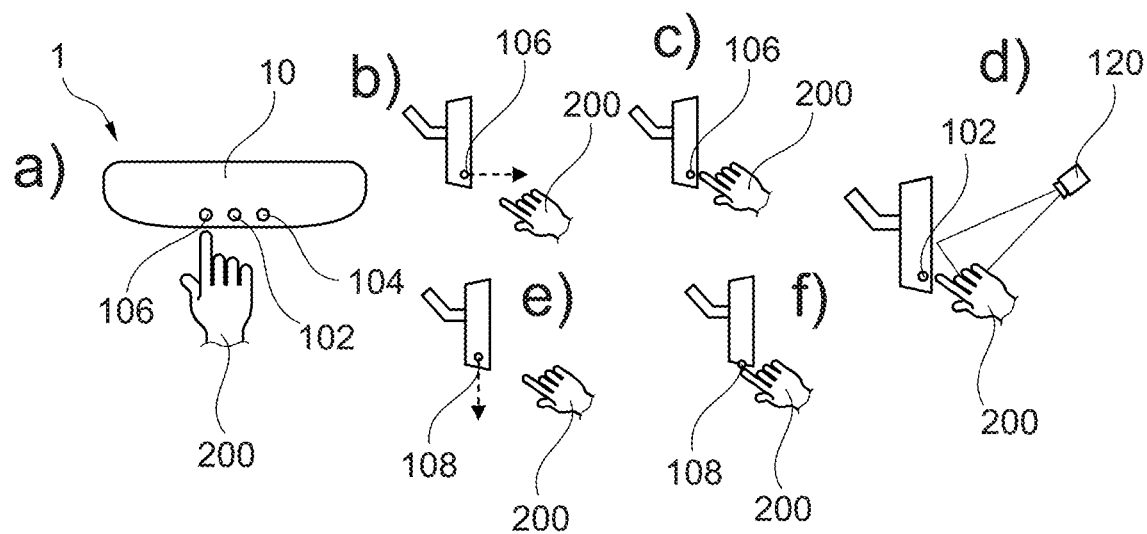
FIG. 6a) to f) illustrates an human machine interface (HMI) provided by an internal rearview device of a seventh embodiment of the disclosure.

With respect to FIG. 6 in the following one example of an HMI of the multi-functional rearview device 1 of the disclosure is described. As can be seen in FIG. 6a), three sensors 102, 104 and 106 are provided on the reflective surface of the EC glass 10. A first sensor 102 can be in form of a TOF sensor, a second sensor 104 can be in form of a touch sensor as described with respect to FIG. 4c, whereas the third sensor 106 can be a photo electric sensor.

FIGS. 6b) and c) explain the functioning of the photo electric sensor 106. For example such a sensor can be provided as a photo coupler emitting and receiving light, such that as long as no light is detected, as shown in FIG. 6b), no actuation is detected. However, as soon as the hand 200 of for example the driver approaches the sensor 106 as shown in FIG. 6c) a reflection takes place as a finger blocks the light and reflects the same. In this case, an actuation intention of the driver is detected and, for example, the dimming of the EC glass 10 is changed as a result thereof.

In order to better detect a gesture of a hand 200 in front of an internal rearview device 1 of the disclosure, in addition to the sensor 102 a camera 120 might be used as shown in FIG. 6d).

Instead of providing sensors on the EC glass 10, it is also possible to arrange a further sensor 108 under the bottom of the housing 60 as shown in FIG. 6e). The respective sensor 108 can be a photo electric sensor and function identical to the sensor 106 detecting the actuation when the finger of the hand 200 approaches as shown in FIG. 6f).

Accordingly, with the disclosure a huge plurality of different actuation means or better alternative HMIs are possible, as the sensors not only have to be placed on the reflective element but also can be placed on the bezel or housing due to the fact that the bezel 32 surrounds the periphery of the reflective element 10 and the housing 60 surrounds the periphery of the bezel 32, as explained with respect in particular in FIG. 4b above.

Figure 7:
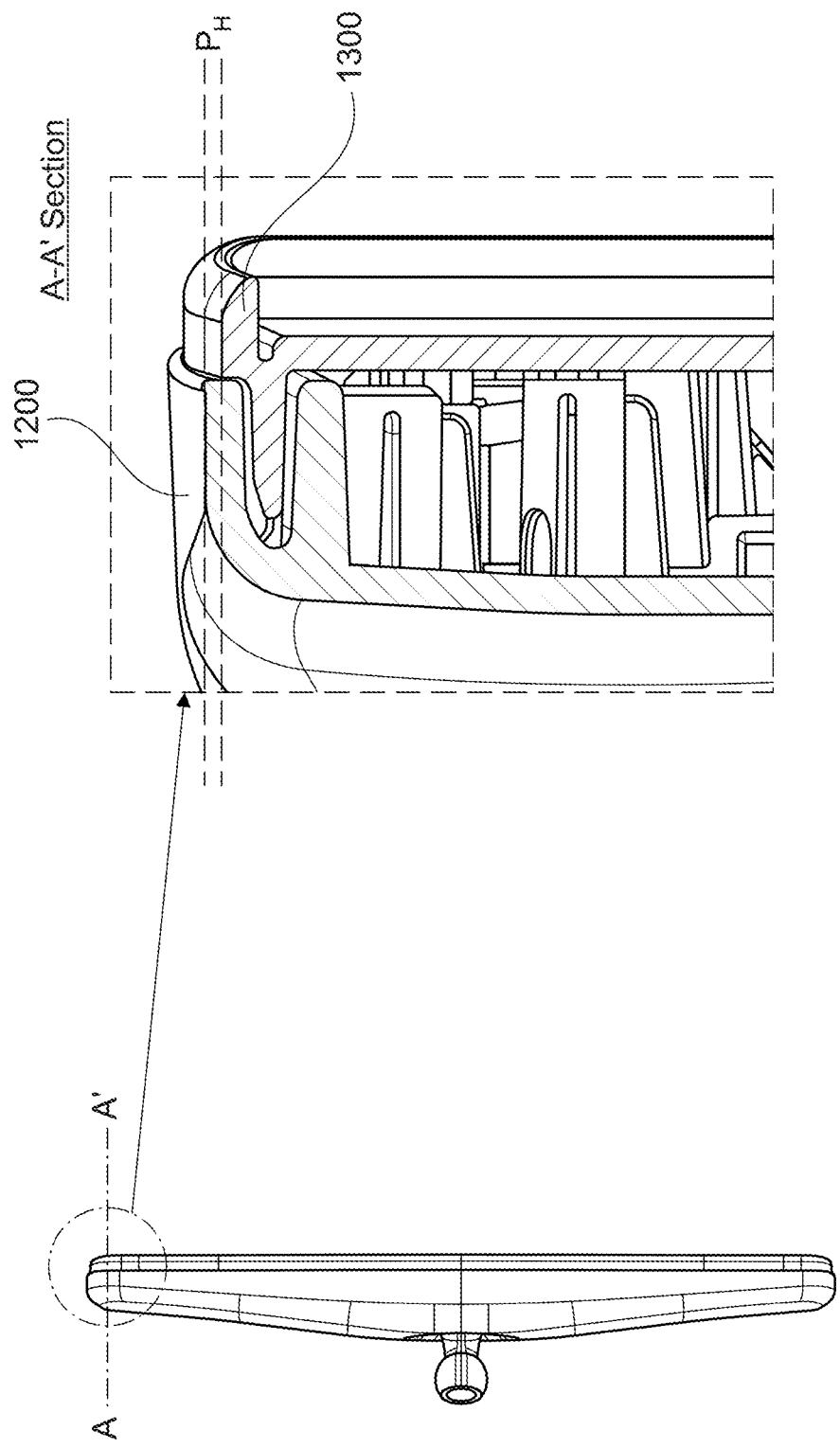
FIG. 7 is a side view as well as a cross-sectional part view illustrating an example of a coupling state between the housing and the housing cover according to an embodiment of the present disclosure.

As illustrated in FIG. 7, the housing 60' according to an embodiment of the present disclosure is formed to be larger than the housing cover 30', with the peripheral length of the housing 60' being formed larger than a peripheral length of the housing cover 30'. For example, a predetermined protrusion or step 65' may be present between the housing 60' and the housing cover 30'. A peripheral surface extending from the housing 60' toward the housing cover 30' may form a naturally curved surface. Therefore, at least a portion of the periphery of the housing 60' is exposed to the driver.

The various embodiments of the internal rearview device 1 of the disclosure described above illustrate not only the multi-functionality thereof, comprising lighting functions for decorative and/or informative purposes, a dimming function, HMI function and the like, but also the design variety providing a particular pleasing appeal paired with implemented security features.

It will be appreciated by those skilled in the art that the disclosure is not restricted in its use to the particular application described. Neither is the present disclosure restricted in its preferred embodiments with regard to the particular elements and/or features described or depicted herein. It will be appreciated that the disclosure is not limited to the embodiment or embodiments disclosed, but is capable of numerous rearrangements, modifications and substitutions without departing from the scope of the disclosure as set forth and defined by the following claims.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

REFERENCE SIGNS 1 multi-function rearview device
10 EC glass
12 window
20 double sided adhesive tape
30, 30' housing cover
31 rounded edge
32 bezel
33 support part
34 opening
35 window
36 through hole
37 step
38 screw hole
39 attachment means
40 EC printed circuit board
42 screw hole
44 cut-out
50 button printed circuit board
60, 60' housing
61 step
62 support rib
64 hook
65, 65' protrusion
70 mount assembly
42 bolt
80-84 button
100 sensor
101 sensor area
102 sensor
103 cover layer
104-108 sensor
110 sensor
120 camera
200 hand
300 light assembly with sensor means
400 light guide
410 light receiving surface
420 light emitting surface
430 laser cut out virtual button

The invention claimed is:

1. An internal rearview device adapted for use with a motor vehicle, comprising:
a rearview element comprising at least one of a reflective element or a display element;
a bezel surrounding the rearview element and being surrounded by a housing; and
a mount assembly configured to attach the housing to the vehicle;
wherein a perimeter edge of the bezel is exposed to and is viewable by a driver of the vehicle when said internal rearview device is mounted in the vehicle,
wherein said perimeter edge comprises a curved surface disposed between at least one of a front surface or a reflective surface of the rearview element and the housing, and
wherein the housing is provided with a protrusion projecting edgewise beyond the curved surface of the perimeter edge such that the protrusion is viewable by the driver when said internal rearview device is mounted in the vehicle.

2. The internal rearview device of claim 1, wherein at least one of:
the protrusion provides a step with a height between 0.1 and 2.1 mm, or
the curvature of the curved surface has a radius of at least 2.5 mm.

3. The internal rearview device of claim 1, further comprising one or more light assemblies, wherein the one or more light assemblies are at least one of:
positioned at least partly within an interior space of the bezel,
emitting light into the bezel and acting as a light guide to illuminate at least a region between the housing and the rearview element, or
providing actuation means.

4. The internal rearview device of claim 3, wherein at least one of:
the one or more light assemblies are configured to direct a plurality of different color lights to an entire surface of the bezel so that the entire bezel can have one color at a time,
the one or more light assemblies are configured to provide a plurality of different color lights to different zones of the bezel so that different zones of the bezel can have different colors at a time, or
the one or more light assemblies are configured to direct light of a selected brightness and/or color to at least one selected region or the entire surface of the bezel.

5. The internal rearview device of any of claim 1, wherein the bezel is made of a plastic substrate which is at least one of colored, surface finished, transparent, or coated;

the bezel is coated and a coating of the bezel is at least one of a decorative coating, an advanced surface technology (AST) surface coating, or a spectrally controlling system; or the bezel is formed or molded from a polymeric substrate.

6. The internal rearview device of claim 5, wherein the bezel is transparent and includes a chromium-based coating making one or more light assemblies beneath the bezel hidden until lit, and the chromium-based coating is an alloy of chromium and a dopant material, the dopant material being selected from hexagonally close-packed transition metals, the alloy having a crystal structure of a primary body-centered cubic phase in coexistence with a secondary omega hexagonally close-packed phase.

7. The internal rearview device of claim 5, wherein at least one of the perimeter edge or the curved surface is provided with the chromium-based coating, or at least one of the perimeter edge or the curved surface is provided with at least one sensor or at least one element of an actuation means, comprising in a mark, icon or a cut-out providing a virtual button.

8. The internal rearview device of claim 1, further comprising at least one of:

a printed circuit board arranged between the housing and the rearview element, or a control means connected to one or more light assemblies or comprising sensor means connected to the printed circuit board.

9. The internal rearview device of claim 3, wherein the bezel is provided by a housing cover, and at least one printed circuit board, a sensor means or the one or more light assemblies are positioned at least partly between the housing cover and the housing, with the housing cover comprising a support part for the at least one of the reflective element or display element being provided with at least one opening for access to the at least one printed circuit board or at least one window for transmission of radiation to a sensor of the sensor means.

10. The internal rearview device of claim 9, wherein the sensor means comprises at least one of:

at least one first sensor in the form of a TOF (Time of Flight) sensor comprising a TOF camera, at least one second sensor for performing an ALS (Ambient Light Sensor) function, at least one third sensor in the form of a photo electric sensor to be irradiated by an additional light source arranged within the vehicle, or at least one fourth sensor in the form of a touch sensor providing a virtual button.

11. The internal rearview device of claim 10, wherein at least one of a first sensor, a first second sensor, a first third sensor, or a first fourth sensor are mounted on a side of the device with the reflective surface of the rearview element, on the reflective surface or behind the reflective surface, provided with a window for transmission of radiation;

a second sensor is mounted on an opposite side of the device from the reflective surface or behind the reflective surface, provided with a window for transmission of radiation;

at least one of a second third sensor or a second fourth sensor are mounted on or in the bezel; or at least one of a third sensor or a third fourth sensor are mounted on or in the housing.

12. The internal rearview device of claim 1, further comprising at least one actuation means comprising one or more virtual buttons mounted on or in the bezel, the housing or on the at least one of the reflective element or display element, comprising a touch sensor or being surveilled by a camera, connected to a control means.

13. The internal rearview device of claim 12, wherein the control means is configured to detect motion patterns within a first spacing interval relative to the reflective surface or provides at least one virtual button within a second spacing interval, with the first spacing interval being provided in the first region of the control means and the second spacing interval being provided in the second region of the control means, wherein the second spacing interval is arranged closer to the reflective surface than the first spacing interval.

14. The internal rearview device of claim 12, wherein the control means is configured to be connected to a control unit of the vehicle to take a state of the vehicle or surroundings of the vehicle into consideration when controlling the device.

15. The internal rearview device of claim 1, wherein the rearview element has a normal state and at least one anti-glare state, in which a glare experienced by a driver of the vehicle as a result of light reflected at the rearview element is reduced, with the at least one of the reflective element or display element comprising an electrochromic (EC) element, which is controlled by a control means, with the electrochromic element including a first electrode.

16. The internal rearview device of claim 15, wherein a printed circuit board is fixed to the housing in form of at least one of an EC printed circuit board, a sensor, or an actuation means printed circuit board.

17. The internal rearview device of claim 16, wherein the printed circuit board is shaped, bent, or provided with at least one cut-out to avoid interference with connection means of the mount assembly.

18. A vehicle equipped with an internal rearview device of claim 1.

19. The vehicle of claim 18, further comprising at least one camera or light source to detect an actuation of the actuation means.

* * * * *